(12) United States Patent
Corley

(10) Patent No.: US 8,917,397 B2
(45) Date of Patent: Dec. 23, 2014

(54) MICROSCOPE ILLUMINATION AND CALIBRATION APPARATUS

(76) Inventor: Ferrand D. E. Corley, Mississauga (CA)

( * ) Notice: Subject to any disclaimer, the term of this patent is extended or adjusted under 35 U.S.C. 154(b) by 237 days.

(21) Appl. No.: 13/506,961

(22) Filed: May 29, 2012

(65) Prior Publication Data

US 2012/0300223 A1 Nov. 29, 2012

Related U.S. Application Data

(60) Provisional application No. 61/457,752, filed on May 27, 2011.

(51) Int. Cl.
| | |
|---|---|
| *G01B 11/14* | (2006.01) |
| *G02B 27/32* | (2006.01) |
| *G02B 21/34* | (2006.01) |
| *G02B 21/00* | (2006.01) |

(52) U.S. Cl.
CPC ............... *G02B 27/32* (2013.01); *G02B 21/34* (2013.01); *G02B 21/00* (2013.01)
USPC ........... 356/625; 256/124; 256/319; 256/603; 382/255; 382/128; 359/383

(58) Field of Classification Search
CPC ........ G01B 11/24; G01B 11/02; G01B 11/14; G03F 7/70625; G01N 21/4788
USPC .................................................. 356/601, 625
See application file for complete search history.

(56) References Cited

U.S. PATENT DOCUMENTS

| | | | | |
|---|---|---|---|---|
| 3,565,512 | A * | 2/1971 | Peck .............................. | 359/656 |
| 4,202,037 | A * | 5/1980 | Glaser et al. .................. | 345/632 |
| 4,887,892 | A * | 12/1989 | Bacus ........................... | 382/133 |
| 5,808,791 | A * | 9/1998 | Kawano et al. ................ | 359/434 |
| 5,883,982 | A * | 3/1999 | Riley et al. .................... | 382/255 |
| 6,097,538 | A * | 8/2000 | Watanabe et al. ............. | 359/390 |
| 6,396,941 | B1 * | 5/2002 | Bacus et al. .................. | 382/128 |
| 7,436,591 | B2 * | 10/2008 | Mizusawa ..................... | 359/388 |
| 7,729,049 | B2 * | 6/2010 | Xu et al. ........................ | 359/383 |
| 2002/0030883 | A1 * | 3/2002 | Adachi et al. ................. | 359/368 |
| 2010/0141752 | A1 * | 6/2010 | Yamada et al. ................ | 348/79 |

* cited by examiner

*Primary Examiner* — Tarifur Chowdhury
*Assistant Examiner* — Isiaka Akanbi

(57) ABSTRACT

An apparatus which provides a multiplicity of test colors and neutral tones simultaneously within a microscope's optical system that may be used to align, and/or calibrate the microscope, and the light source and any associated recording devices, automatically or with input from an operator. The test colors and neutral tones may also be used as references against which to judge specimens being viewed in the microscope.

Also disclosed is a method of operating a microscope using such a such pattern.

3 Claims, 4 Drawing Sheets

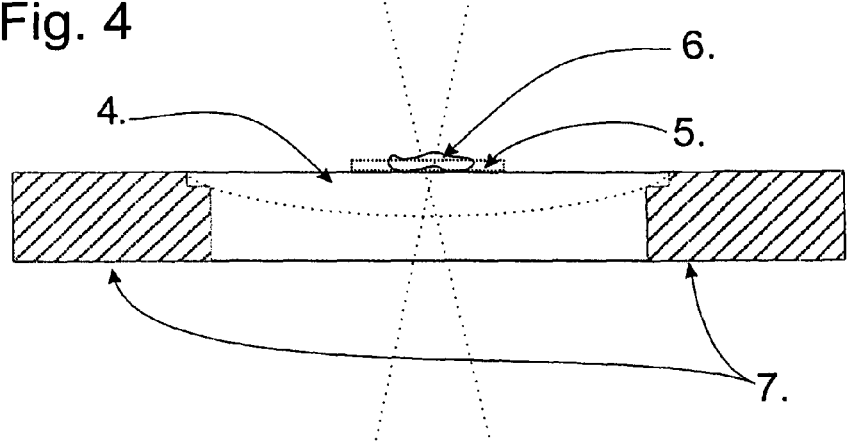
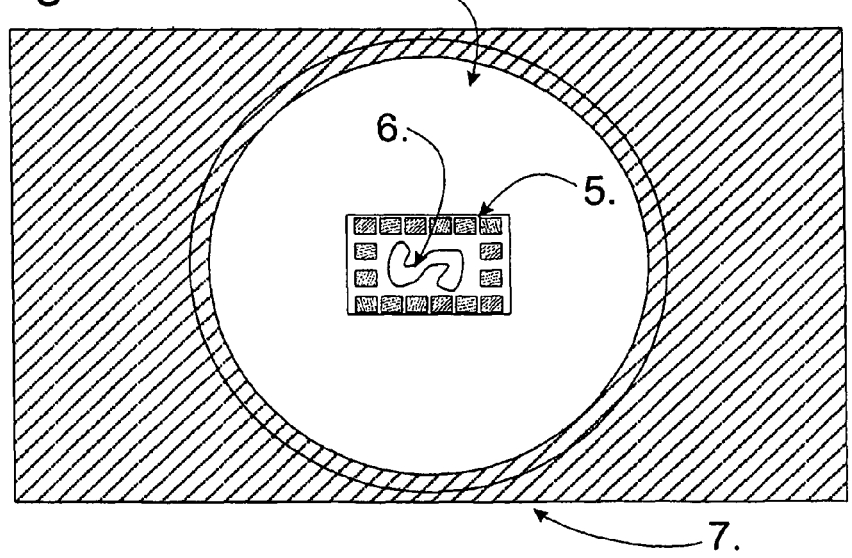

MICROSCOPE ILLUMINATION AND CALIBRATION APPARATUS

This application is based on U.S. Provisional application Ser. No. 61/457,752, filed May 27, 2011 entitled Microscope Illumination and Calibration Apparatus, the priority of which application is claimed.

FIELD OF THE INVENTION

The invention relates to an apparatus to optimize the accuracy of image reproduction of samples viewed in a microscope.

BACKGROUND OF THE INVENTION

With the ever-increasing number of microscopy images, both still and video, being recorded and transmitted, accurate interpretation of the images requires a known standard against which they can be judged or measured. In the recording and reproduction of typical still or moving images, this can be accomplished by including a reference test pattern having known characteristics within the scene. This apparatus of the invention is designed to provide similar benefits to those working in microscopy which heretofore have not been available.

BRIEF SUMMARY OF THE INVENTION

The apparatus comprises an illuminated panel incorporating a white area and a test pattern, typically comprising a neutral grayscale and precision color patches having known characteristics. An objective lens is focused on said illuminated test pattern. The image of said test pattern is projected and focused as an aerial image, at a fraction of its original size, on the stage of the microscope. A positive lens, within the microscope stage, relays said image through the microscope optics to the operator and/or electronic image retrieval system for data analysis and the microscope is used in the normal manner. When evaluating skin and blood samples, for example, it may be convenient to use a test pattern having the same color characteristics as that used in taking pictures of a patient during an examination or operation.

BRIEF DESCRIPTION OF THE DRAWINGS

The invention is described by way of illustration with reference to the accompanying drawings in which:

FIG. 4—Side view of the microscope stage; and,
FIG. 5—Plan view of the microscope stage.

DESCRIPTION OF A PREFERRED EMBODIMENT

Figure 1:
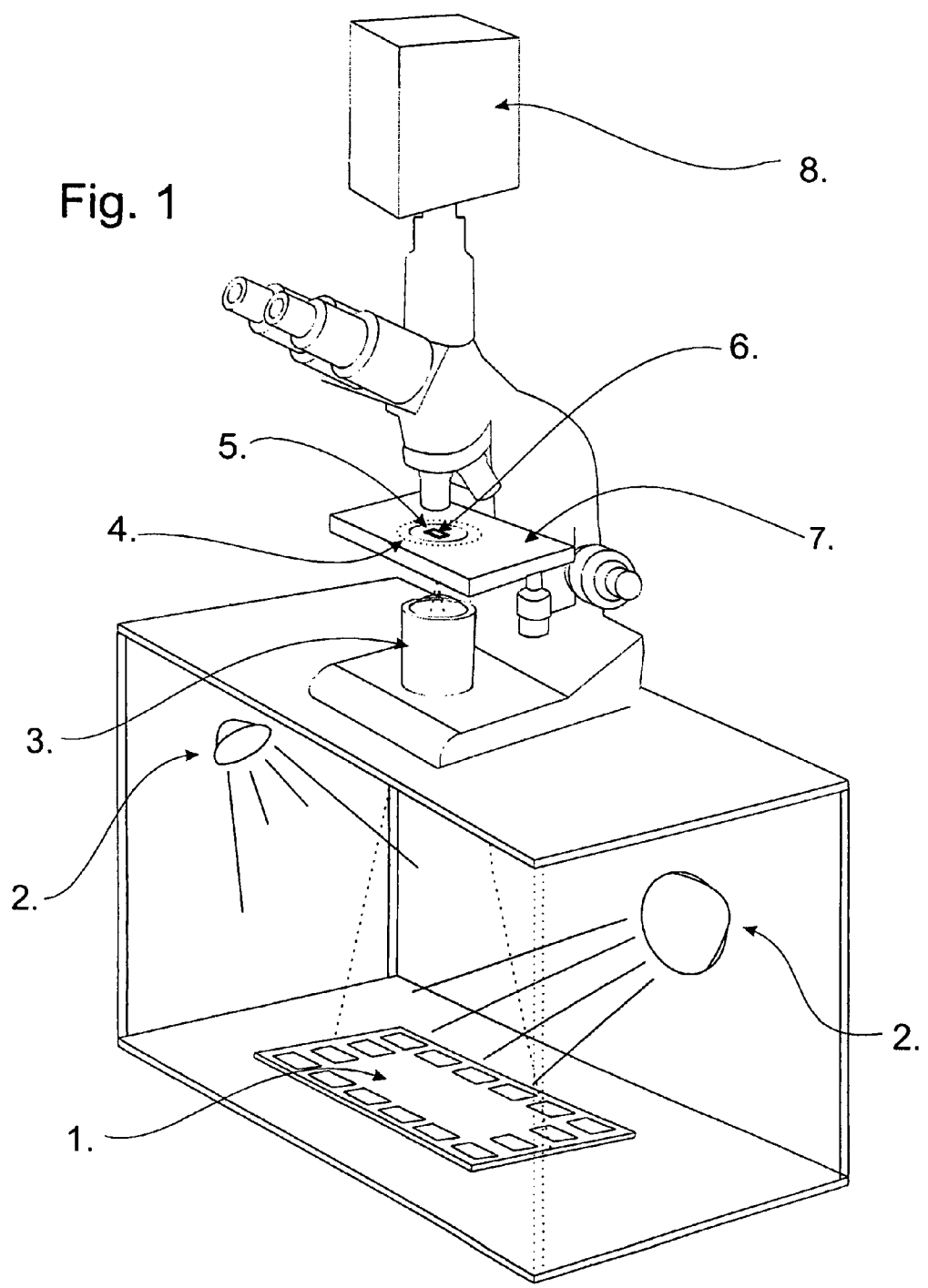
FIG. 1—Overall view of one embodiment of the apparatus.

Referring to FIG. 1, a test pattern 1 comprises a white panel surrounded by grayscale and color test elements. The test pattern 1 is evenly illuminated by lamps 2.

An objective lens 3 focuses, through relay lens 4, a greatly reduced aerial or phantom image 5 of the test pattern 1, coincidental with specimen 6 on microscope stage 7, (see also FIGS. 4 and 5).

The reduced aerial or phantom image 5 of the test pattern coincident with the specimen 6 may now be viewed in the microscope as a single image or recorded as such using digital cameras and/or other data recording devices 8 as are well known in the trade.

Figure 2:
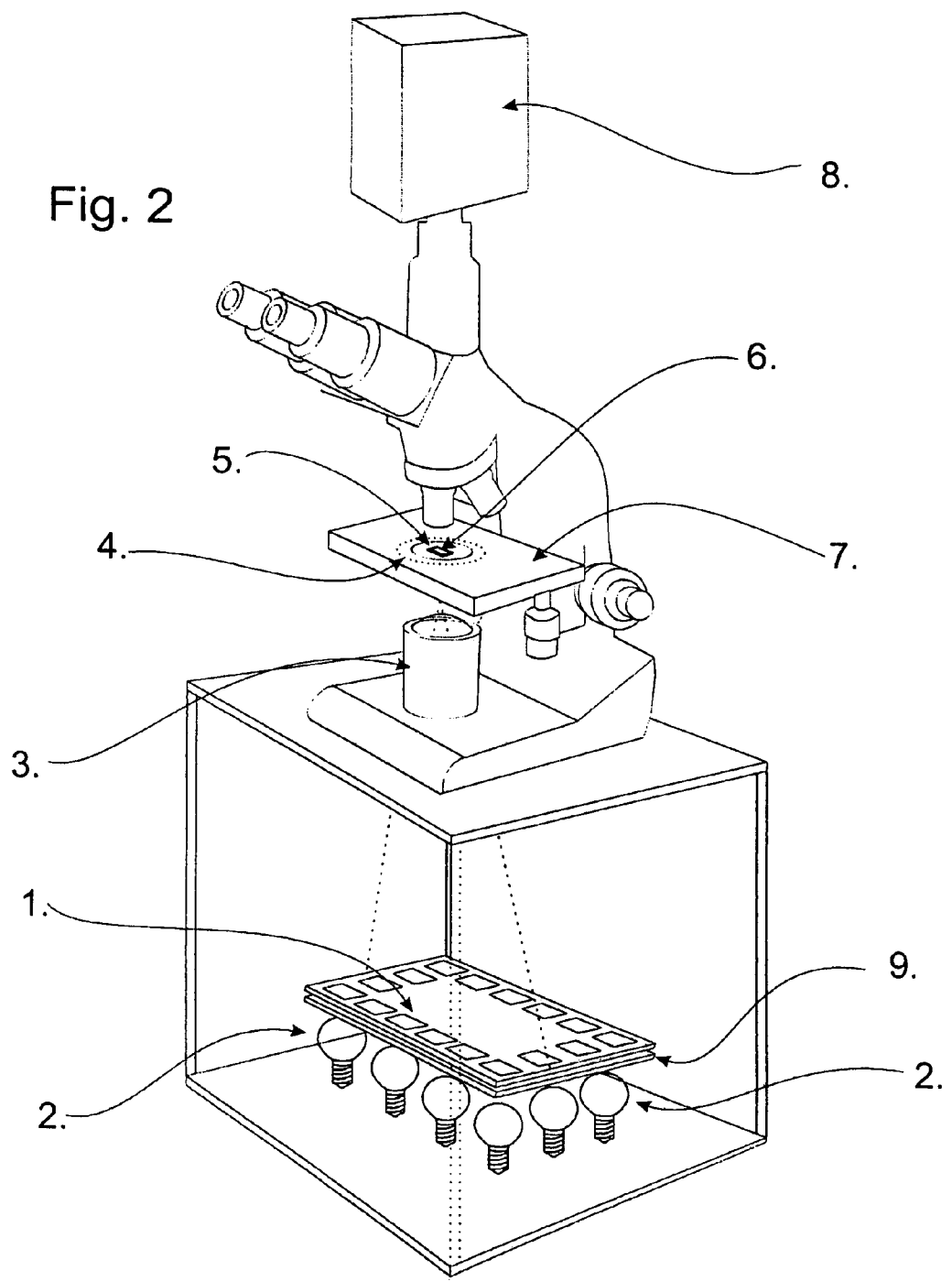
FIG. 2—Overall view of the apparatus using a rear-lit light source.

ADDITIONAL EMBODIMENTS a—Another embodiment provides for different or multiple illuminants such as deuterium or LED sources producing electromagnetic energy at UV, infrared and other specific wavelengths, to be used. These may be valuable in identifying particular characteristics in specimens under examination.

b—Another embodiment FIG. 2 uses a rear-lit transmissive, instead of reflective, test pattern 1 with the light sources 2 positioned behind the test pattern.

Figure 3:
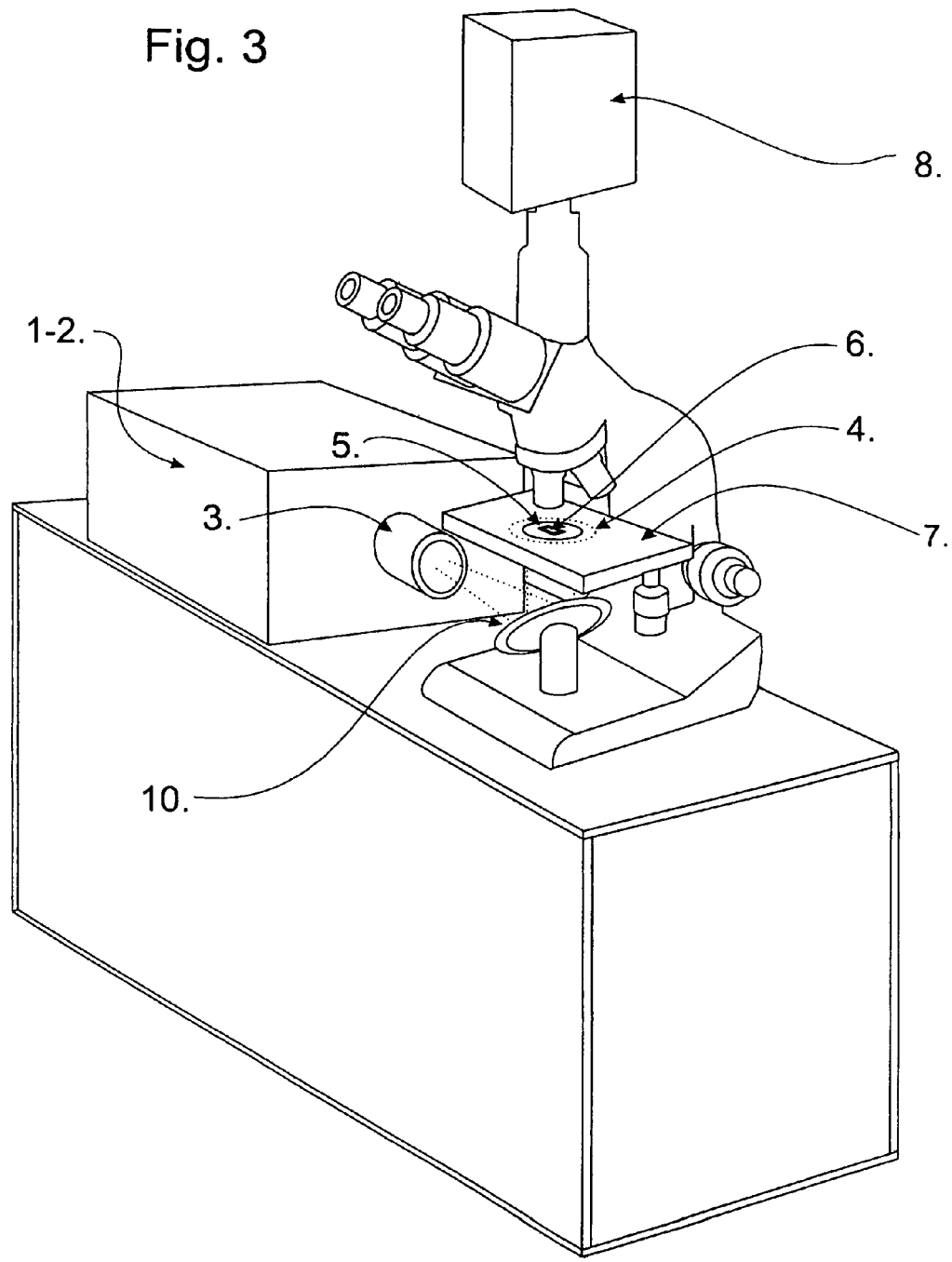
FIG. 3—Side view of apparatus with vertically mounted test pattern.

A diffuser 9 may be used for light evenness and to produce diffuse illumination. If a specular light source is preferred, a single illuminant is used and a positive lens above the light source replaces the diffuser.

c—In the embodiment of FIG. 3, the apparatus is rotated to the desired angle, typically 90° relative to the microscope stage. This configuration is suitable for use with microscopes equipped with mirrors 10 designed to accept light from different angles and positions.

The foregoing are descriptions of preferred embodiments of the invention which are given here by way of example only. The invention is not to be taken as limited to any of the specific features as described, but comprehends all such variations thereof as come within the appended claims.

What is claimed is:

1. An apparatus for illuminating and calibrating a microscope of the type having a stage, and comprising:
    a. a microscope specimen stage for supporting a specimen
    b. an illuminated test panel separate from said microscope specimen stage having a white area and a test pattern, said test pattern having a neutral grayscale and having precision color patches having known characteristics;
    c. an objective lens focussed on said test pattern on said illuminated test panel and being operable to project and focus a reduced size aerial image of said test pattern, coincident with and adjacent to said specimen on said specimen stage, to create a composite image of said specimen and of said test pattern;
    d. a positive relay lens operable to relay said composite image through the microscope.

2. An apparatus for illuminating and calibrating a microscope of the type having a specimen stage, as claimed in claim 1 and wherein said positive lens, within the microscope, is operable to relay said
    composite image through the microscope to one of an operator and an electronic image retrieval system.

3. A method of viewing an object through a microscope, said microscope having a specimen stage, and a separate test panel having a test image thereon, and comprising the steps of;
    placing a specimen on the specimen stage;
    illuminating the test panel separate from said specimen stage, the test image having a white area and a neutral grayscale and having precision color patches having known characteristics; and
    focussing an objective lens on said test pattern image on said illuminated test panel;
    producing an image of a first predetermined size, said objective lens being operable to project and focus said image of said test pattern as an aerial image, at a second size image less than said predetermined first size; and, directing said second size test pattern image on said specimen stage of the microscope.

\* \* \* \* \*